United States Patent
Noguchi et al.

(10) Patent No.: US 10,774,200 B2
(45) Date of Patent: Sep. 15, 2020

(54) TRANSPARENT ABS RESIN COMPOSITION

(71) Applicant: Asahi Fiber Glass Co., Ltd., Chiyoda-ku (JP)

(72) Inventors: Takenori Noguchi, Chiyoda-ku (JP); Keiji Sekine, Chiyoda-ku (JP)

(73) Assignee: Asahi Fiber Glass Co., Ltd., Chiyoda-ku (JP)

( * ) Notice: Subject to any disclaimer, the term of this patent is extended or adjusted under 35 U.S.C. 154(b) by 131 days.

(21) Appl. No.: 15/523,015

(22) PCT Filed: Oct. 30, 2015

(86) PCT No.: PCT/JP2015/080779
§ 371 (c)(1),
(2) Date: Apr. 28, 2017

(87) PCT Pub. No.: WO2016/068303
PCT Pub. Date: May 6, 2016

(65) Prior Publication Data
US 2017/0335088 A1 Nov. 23, 2017

(30) Foreign Application Priority Data
Oct. 30, 2014 (JP) ................................. 2014-221230

(51) Int. Cl.
*C08L 55/02* (2006.01)
*C08K 7/02* (2006.01)
*C08K 3/40* (2006.01)
*C08K 9/00* (2006.01)
*C08K 7/14* (2006.01)
*C03C 13/00* (2006.01)
*C03C 3/091* (2006.01)
*C03C 25/26* (2018.01)

(52) U.S. Cl.
CPC ............... *C08K 7/14* (2013.01); *C03C 3/091* (2013.01); *C03C 13/00* (2013.01); *C03C 25/26* (2013.01); *C08K 3/40* (2013.01); *C08K 9/00* (2013.01); *C08L 55/02* (2013.01)

(58) Field of Classification Search
CPC .. C08L 55/02; C08K 7/14; C08K 3/40; C08K 9/00
See application file for complete search history.

(56) References Cited

U.S. PATENT DOCUMENTS

| 4,547,533 A * | 10/1985 | Zabrocki | C08K 7/14 523/206 |
| 4,771,107 A * | 9/1988 | Hoenl | C08L 55/02 525/314 |
| 2009/0124750 A1 * | 5/2009 | Hong | C08L 25/14 524/505 |
| 2009/0215960 A1 * | 8/2009 | Jin | C08F 220/18 525/94 |
| 2011/0070451 A1 * | 3/2011 | Khanna | B32B 17/04 428/428 |
| 2013/0331500 A1 * | 12/2013 | Yokoe | B29C 67/246 524/502 |

FOREIGN PATENT DOCUMENTS

| JP | 3-67088 A | 10/1991 |
| JP | 4-106158 A | 4/1992 |
| JP | 7-70392 A | 3/1995 |
| JP | 7-156279 A | 6/1995 |
| JP | 7-216188 A | 8/1995 |
| JP | 2649211 B2 | 9/1997 |
| JP | WO 99/01393 A1 | 1/1999 |
| JP | 2006-22236 A | 1/2006 |
| JP | 2006-160553 A | 6/2006 |
| JP | 2007-77334 A | 3/2007 |
| JP | 2008-45040 A | 2/2008 |
| JP | 2012-51773 A | 3/2012 |
| JP | 2012-116695 A | 6/2012 |
| JP | 2012-224762 A | 11/2012 |
| WO | WO-9901393 A1 * | 1/1999 ............. C03C 13/00 |
| WO | WO-2012117840 A1 * | 9/2012 ........... B29C 67/246 |

OTHER PUBLICATIONS

International Search Report dated Jan. 26, 2016, in PCT/JP2015/080779 filed Oct. 30, 2015.
Combined Office Action and Search Report dated Dec. 25, 2018 in Chinese Patent Application No. 201580058960.6, 17 pages (with English translation and English translation of categories of cited documents).
Yi, G. et al. "Study and Application Status of Transparent ABS" China Engineering Plastics Application Magazine, 2007, pp. 315-318 and Cover Pages (with English abstract).

(Continued)

*Primary Examiner* — Karuna P Reddy
(74) *Attorney, Agent, or Firm* — Oblon, McClelland, Maier & Neustadt, L.L.P.

(57) ABSTRACT

A transparent ABS resin composition which enables a production of a molded article retaining an excellent mechanical strength without decreasing the transparency and opacity, consisting of: based on a total mass of the transparent ABS resin composition, 70 to 98% by mass of a transparent ABS resin; and 2 to 30% by mass of a glass filler. The glass filler consists of glass components and optionally at least one oxide.

12 Claims, No Drawings

TRANSPARENT ABS RESIN COMPOSITION

TECHNICAL FIELD

The present invention relates to a transparent ABS resin composition. More specifically, the present invention relates to an ABS resin composition excellent in both of mechanical strength and transparency.

BACKGROUND ART

ABS resins (acrylonitrile-butadiene-styrene resins) are amorphous thermoplastic resins. ABS resins excellent in processability and so forth are widely used in industrial products as well as household products. However, depending on the application, the strength and the heat deflection temperature thereof are not sufficient in some cases.

For this reason, there is a technique for enhancing the strength and the heat deflection temperature by blending an ABS resin with glass fibers (Patent Literatures 1 and 2).

Moreover, there is a technique for further improving the strength and the hue of an ABS resin blended with glass fibers by surface-treating the glass fibers (Patent Literature 3).

Meanwhile, although an ABS resin is an opaque material obtained by mixing a butadiene-based rubber when an acrylonitrile-styrene copolymer resin is polymerized, there is a technique for producing a transparent ABS resin by reducing the weight average particle size of such a butadiene-based rubber (Patent Literature 4).

CITATION LIST

Patent Literatures

Patent Literature 1: Japanese Patent Application Publication No. Hei 7-216188
Patent Literature 2: Japanese Patent Application Publication No. 2012-224762
Patent Literature 3: Japanese Patent No. 2649211
Patent Literature 4: Japanese Examined Patent Application Publication No. Hei 3-67088

SUMMARY OF INVENTION

Technical Problem

The present inventors have studied the effect of blending glass fibers into a transparent ABS resin. Consequently, the inventors have found that blending glass fibers enhances particular types of mechanical strength of a molded article but impairs the transparency and opacity thereof.

Solution to Problem

To solve the above-described problem, the present inventors have conducted intensive studies. As a result, the inventors have found that blending a transparent ABS resin with a particular amount of a glass filler having a particular composition enables a production of a molded article from the transparent ABS resin blended with the glass filler, the molded article retaining an excellent mechanical strength without decreasing the transparency and opacity. Based on such a finding, the present inventors have completed the present invention.

Specifically, the present invention relates to the following.
1. A transparent ABS resin composition comprising: based on a total mass of the transparent ABS resin composition, 70 to 98% by mass of a transparent ABS resin; and 2 to 30% by mass of a glass filler, wherein
the glass filler comprises: based on a total mass of the glass filler,
  55 to 60% by mass of silicon dioxide ($SiO_2$);
  10 to 15% by mass of aluminium oxide ($Al_2O_3$);
  18 to 22% by mass of calcium oxide (CaO);
  2 to 8% by mass of boron oxide ($B_2O_3$);
  0.01 to 1% by mass of magnesium oxide (MgO); and
  0.01 to 1% by mass of sodium oxide ($Na_2O$) or potassium oxide ($K_2O$), and
a mass ratio of calcium oxide to silicon dioxide ($CaO/SiO_2$) in the glass filler is 0.36 to 0.40.
2. The transparent ABS resin composition according to 1, wherein the glass filler comprises sodium oxide ($Na_2O$).
3. The transparent ABS resin composition according to 1 or 2, wherein the mass ratio of calcium oxide to silicon dioxide ($CaO/SiO_2$) in the glass filler is 0.36 to 0.38.
4. The transparent ABS resin composition according to any one of 1 to 3, wherein the glass filler is glass fibers surface-treated with a sizing agent.
5. The transparent ABS resin composition according to any one of 1 to 4, wherein the transparent ABS resin comprises methyl methacrylate.
6. A molded article obtained by molding the ABS resin composition according to any one of 1 to 5.
7. The molded article according to 6, which is an injection molded article.

Effects of Invention

As described later in Examples, the transparent ABS resin composition of the present invention makes it possible to provide a molded article made of the transparent ABS resin blended with the glass filler, the molded article retaining an excellent mechanical strength without decreasing the transparency and opacity. Thus, the present invention makes it possible to provide a molded article excellent in aesthetical characteristics.

DESCRIPTION OF EMBODIMENTS

A transparent ABS resin composition of the present invention contains a transparent ABS resin and a glass filler as essential components. Hereinafter, each component will be described in detail.

Transparent ABS Resin

The transparent ABS resin is an acrylonitrile-butadiene-styrene resin.

The transparent ABS resin is a resin obtained by mixing a butadiene-based rubber such as a butadiene-styrene copolymer when a transparent acrylonitrile-styrene copolymer resin (AS resin) is polymerized, so that the butadiene-based rubber is dispersed or copolymerized in the AS resin. The butadiene-based rubber mixed at the time of the polymerization has a small weight average particle diameter, preferably 150 μm or less, to enhance the light transmittance.

When the transparent ABS resin used in the present invention is formed into a molded article having a thickness of 2 mm, the total light transmittance for visible light is 85% or more, preferably 90% or more. The use of the transparent ABS resin having a total light transmittance of 85% or more in combination with a glass filler to be described later makes it possible to suppress decreases in the transparency and opacity which would otherwise occur when glass fibers of conventional techniques are used.

The total light transmittance can be measured according to JIS-K 7361.

Moreover, the transparent ABS resin has a refractive index of preferably 1.530 to 1.555, and more preferably 1.535 to 1.550.

When the transparent ABS resin having a refractive index of 1.530 to 1.555 is used in combination with the glass filler to be described later, the difference in refractive index between the two is small. This makes it possible to further suppress decreases in the transparency and opacity which would otherwise occur when glass fibers of conventional techniques are used.

The refractive index of the transparent ABS resin can be measured according to JIS K 7142.

The transparent ABS resin has an MFR of preferably 30 g/10 minutes to 45 g/10 minutes at a temperature of 220° C. with a load of 98 N. The MFR can be measured by the measurement method described in JIS K 7210.

In the transparent ABS resin composition, the blending ratio (based on mass) of acrylonitrile (A):butadiene (B): styrene (S) in the ABS resin can be set as appropriate in accordance with the usage. The blending ratio is preferably A:B:S (based on mass)=5 to 20%:10 to 30%:40 to 70%, and more preferably 5 to 15%:10 to 20%:45 to 65%. With A:B:S (based on mass) of 5 to 20%:10 to 30%:40 to 70%, the yellow coloring of the transparent ABS resin is suppressed, the transparency is further enhanced, and the aesthetical characteristics as a transparent ABS resin are enhanced; simultaneously, the impact strength can be retained.

Moreover, the transparent ABS resin used in the present invention has a weight-average molecular weight of preferably 50,000 to 150,000, and more preferably 50,000 to 100,000. The weight-average molecular weight of 50,000 to 150,000 makes it possible to more favorably retain the moldability and the durability as a molded article.

The weight-average molecular weight of the transparent ABS resin can be measured according to JIS K 7252.

The transparent ABS resin may be obtained as: (1) a polymer blend obtained by physically mixing an acrylonitrile-styrene resin with polybutadiene, (2) polybutadiene with styrene and acrylonitrile grafted thereon, or (3) an emulsion polymerization product of three types of monomers constituting acrylonitrile, butadiene, and styrene.

Note that the transparent ABS resin used in the present invention may contain a monomer having an unsaturated ethylenic bond, in addition to acrylonitrile, butadiene, and styrene. Such a monomer includes methyl acrylate, ethyl acrylate, n-propyl acrylate, n-butyl acrylate, methyl methacrylate, and the like. Particularly, from the viewpoints of transparency and glass transition temperature as one indicator of heat resistance, methyl methacrylate (M) is preferable.

A preferable blending ratio is M:A:B:S (based on mass)= 20 to 40%:5 to 10%:10 to 20%:40 to 60%.

In the present invention, one type of the transparent ABS resin may be used alone, or multiple types of the transparent ABS resin may be used in combination.

The transparent ABS resin is a known material, and can be easily obtained in the market or can be prepared.

The content of the transparent ABS resin in the ABS resin composition of the present invention is 70 to 98% by mass, preferably 80 to 95% by mass, based on the total mass of the ABS resin composition. The content of the transparent ABS resin being 70 to 98% by mass makes it possible to obtain a molded product having a high total light transmittance.

Glass Filler

The glass filler used in the present invention contains: based on the total mass of the glass filler,
55 to 60% by mass of silicon dioxide ($SiO_2$);
10 to 15% by mass of aluminium oxide ($Al_2O_3$);
18 to 22% by mass of calcium oxide (CaO);
2 to 8% by mass of boron oxide ($B_2O_3$);
0.01 to 1% by mass of magnesium oxide (MgO); and
0.01 to 1% by mass of sodium oxide ($Na_2O$) or potassium oxide ($K_2O$).

In the glass filler, the mass ratio of calcium oxide to silicon dioxide ($CaO/SiO_2$) is 0.36 to 0.40.

When the glass filler having the above composition is used in combination with the above-described ABS resin, the difference in refractive index between the two is small. This makes it possible to suppress decreases in the transparency and opacity which would otherwise occur when glass fibers of conventional techniques are used.

The content of silicon dioxide ($SiO_2$) is 55 to 60% by mass, preferably 56 to 58% by mass, based on the total mass of the glass filler. The content of $SiO_2$ being 55% by mass or more makes it possible to obtain a glass filler having a favorable strength. The content of $SiO_2$ being 60% by mass or less makes it possible to obtain a favorable solubility when the glass filler is produced.

The content of aluminium oxide ($Al_2O_3$) is 10 to 15% by mass, preferably 12 to 15% by mass, based on the total mass of the glass filler. The content of $Al_2O_3$ being 10% by mass or more makes it possible to obtain a glass filler having a favorable chemical durability (water resistance and the like). The content of $Al_2O_3$ being 15% by mass or less makes it possible to obtain a favorable solubility and a favorable glass uniformity when the glass filler is produced.

The content of calcium oxide (CaO) is 18 to 22% by mass, preferably 19 to 21% by mass, based on the total mass of the glass filler. The content of CaO being 18% by mass or more makes it possible to obtain a favorable solubility when the glass filler is produced. The content of CaO being 22% by mass or less makes it possible to obtain a favorable transparency by suppressing the crystallization of the glass.

The content of boron oxide ($B_2O_3$) is 2 to 8% by mass, preferably 4 to 7% by mass, based on the total mass of the glass filler. When the content of $B_2O_3$ is 2% by mass or more, the glass has a low melt viscosity and is easily turned into fibers. The content of $B_2O_3$ being 8% by mass or less makes it possible to obtain a glass filler having a favorable strength.

The content of magnesium oxide (MgO) is 0.01 to 1% by mass, preferably 0.1 to 0.5% by mass, based on the total mass of the glass filler. When the content of MgO is 0.01% by mass or more, some Ca of CaO above is substituted with Mg, making it possible to enhance the durability (tensile strength and the like) of the glass filler. The content of MgO being 1% by mass or less makes it possible to obtain a favorable solubility when the glass filler is produced.

The content of sodium oxide ($Na_2O$) or potassium oxide ($K_2O$) is 0.01 to 1% by mass, preferably 0.5 to 1% by mass, based on the total mass of the glass filler. When the content of $Na_2O$ or $K_2O$ is 0.01% by mass or more, the glass has a low melt viscosity and is easily turned into fibers. When the content of $Na_2O$ or $K_2O$ is 1% by mass or less, the water resistance of the glass never decreases.

The mass ratio of calcium oxide to silicon dioxide ($CaO/SiO_2$) in the glass filler is 0.36 to 0.40, preferably 0.36 to 0.38, and more preferably 0.36 to 0.37. The $CaO/SiO_2$ of 0.36 to 0.40 makes it possible to suppress decreases in the transparency and opacity by controlling the refractive index of the glass filler without impairing the favorable solubility when the glass filler is produced.

The refractive index of the glass filler having the above composition is 1.543 to 1.552, preferably 1.545 to 1.552, and more preferably 1.545 to 1.550.

When the glass filler having a refractive index of 1.543 to 1.552 is used in combination with the above-described ABS resin, the difference in refractive index between the two is small. This makes it possible to suppress decreases in the transparency and opacity which would otherwise occur when glass fibers of conventional techniques are used.

The refractive index of the glass filler can be measured by an immersion method according to the method B in JIS K 7142.

In addition to the above glass components, the glass filler may contain the following optional components within such ranges that the spinnability, the water resistance, and so forth of the glass filler are not adversely influenced. For example, an oxide containing an element such as lanthanum (La), Y (yttrium), gadolinium (Gd), bismuth (Bi), antimony (Sb), tantalum (Ta), niobium (Nb), or tungsten (W) may be incorporated as a component for increasing the refractive index of the glass. In addition, an oxide containing an element such as cobalt (Co), copper (Cu), or neodymium (Nd) may be incorporated as a component for removing the yellowing of the glass.

In the glass filler used in the present invention, the content of $Fe_2O_3$ (oxide basis) as an impurity is preferably less than 0.1% by mass based on the total mass of the glass filler. The content of $Fe_2O_3$ being less than 0.1% by mass makes it possible to suppress the coloring of the glass filler.

The form of the glass filler is not particularly limited, as long as the glass filler can be blended with the ABS resin. Preferable forms include glass fibers, glass powders, glass flakes, milled fibers, and glass beads.

In the present invention, a glass filler of a single form may be used alone, or glass fillers of multiple forms may be used in combination.

The glass fibers can be produced by using a conventionally known spinning method for glass long fibers. Examples thereof includes: a direct melt (DM) method involving continuously turning glass raw materials into glass in a melting furnace, introducing the glass into a forehearth, attaching a bushing to a bottom portion of the forehearth for spinning; a remelting method involving processing molten glass into the shape of marble, cullet, or rod, followed by remelting and spinning; and other similar methods.

The average diameter of the glass fibers is not particularly limited, but glass fibers having an average diameter of 3 to 25 μm are preferably used. Glass fibers having an average diameter of 3 μm or more suppress an irregular reflection due to an increased contact area between the glass fibers and the resin, and can make the transparency of the molded article favorable. Glass fibers having an average diameter of 25 μm or less have a favorable strength; as a result, the molded article can have a favorable strength.

The fiber lengths of the glass fibers are not particularly limited, but glass fibers having fiber lengths of 1.5 to 6 mm are preferably used. Glass fibers having fiber lengths of 1.5 to 6 mm are capable of retaining high aspect ratios even in a molded article after compounding and molding with the transparent ABS resin, so that the mechanical strength of the molded article can be further enhanced.

The glass powders can be obtained by using a conventionally known production method. For example, a powder having desired particle diameters can be prepared by melting glass raw materials in a melting furnace, introducing the melt into water for the water grinding, or molding the melt into a sheet shape with a cooling roll and grinding the obtained sheet. The particle diameters of such a glass powder are not particularly limited, but a glass powder having particle diameters of 1 to 100 μm is preferably used.

The glass flakes can be obtained by using a conventionally known production method. For example, flakes having desired aspect ratios can be prepared by melting glass raw materials in a melting furnace, drawing the melt into a tubular shape to make the glass thickness constant, then grinding the glass with a roll to obtain frits having particular thicknesses, and grinding the frits. The thicknesses and aspect ratios of such glass flake are not particularly limited, but glass flakes having thicknesses of 0.1 to 10 μm and aspect ratios of 5 to 150 are preferably used.

The milled fibers can be obtained by using a conventionally known production method. For example, milled fibers can be prepared by grinding a strand of glass fibers with a hammer mill or a ball mill. The fiber diameters and aspect ratios of such milled fibers are not particularly limited, but milled fibers having fiber diameters of 3 to 25 μm and aspect ratios of 2 to 150 are preferably used.

The glass beads can be obtained by using a conventionally known production method. For example, glass beads having desired particle diameters can be prepared by melting glass raw materials in a melting furnace and spraying the melt using a burner. The particle diameters of such glass beads are not particularly limited, but glass beads having particle diameters of 5 to 300 μm are preferably used.

When glass fibers are used as the glass filler, the glass fibers are preferably surface-treated with a sizing agent. The surface treatment with a sizing agent enhances the mechanical strength of the glass fibers, consequently making it possible to enhance the impact resistance of the ABS resin molded article.

As the sizing agent, it is possible to use ones applicable to glass fibers without particular limitation. Nevertheless, the sizing agent for glass fibers described in Japanese Patent No. 2649211 (Patent Literature 3) is preferable because of the excellent effects of enhancing the mechanical strength and the hue of glass fibers. A specific example of such a preferable sizing agent for glass fibers includes a sizing agent for glass fibers, containing 1 to 10% by weight of an epoxy resin having an epoxy equivalent of 900 or more, 1 to 10% by weight of an acrylonitrile-styrene copolymer resin, and 0.1 to 5% by weight of a silane coupling agent.

The content of the glass filler in the ABS resin composition of the present invention is 2 to 30% by mass, preferably 2 to 15% by mass, and more preferably 5 to 10% by mass, based on the total mass of the ABS resin composition. The content of the glass filler being 2 to 30% by mass makes it possible to enhance the dimensional stability during the molding and particular types of strength while the molded article retains the transparency.

The ABS resin composition of the present invention can be blended with a well-known additive as an optional component within a range not impairing predetermined effects of the present invention. For example, blending a flow improver makes it possible to enhance the molding flowability.

The ABS resin composition of the present invention has a flowability represented by a melt flow rate (MFR) of preferably 10 g/10 minutes to 30 g/10 minutes, and more preferably 15 g/10 minutes to 25 g/10 minutes, at a temperature of 220° C. with a load of 98 N. The MFR within the above range makes it possible to obtain an excellent molding flowability. The MFR can be measured by the measurement method described in JIS K 7210.

The ABS resin composition of the present invention can be produced by adopting a conventionally known method as the production method for the ABS resin composition without particular limitation. An example of a preferable production method includes a method involving melting and kneading with an extruder.

The production condition can be set as appropriate and is not particularly limited. The melting temperature condition is preferably within a range of 210 to 240° C. because the glass filler and the transparent ABS resin are sufficiently kneaded, making it possible that the glass filler and the transparent ABS resin more surely adhere to each other at an interface therebetween.

The ABS resin composition of the present invention can be formed into a molded article by applying a conventionally known method as the molding method for the ABS resin molded article without particular limitation. Examples of the molding method include an injection molding method, an extrusion molding method, a compression molding method, a calender molding method, and the like.

The molding condition can be set as appropriate and is not particularly limited. The melting temperature condition during the molding is preferably within a range of 200 to 230° C. because a sufficient flow is ensured during the molding, making it possible to obtain a molded product with a predetermined dimensional precision.

The thickness of a molded article obtained by molding the ABS resin composition of the present invention (hereinafter also referred to as the molded article of the present invention) is not particularly limited, and can be set as appropriate in accordance with the purpose of use of the molded article. Nevertheless, the thickness is preferably 1 to 10 mm, and more preferably 1 mm to 5 mm. The thickness of the molded article being 1 to 10 mm makes it possible to obtain such a molded article that the warping hardly occurs, and that the mechanical strength and the transparency are excellent.

Regarding the transparency of the molded article of the present invention, when the molded article has a thickness of 2 mm, the molded article of the present invention has a total light transmittance for visible light of preferably 80% or more, and more preferably 85% or more. With the total light transmittance for visible light of 80% or more, the molded article can be suitably used in applications requiring a high transparency. The total light transmittance for visible light can be measured according to JIS-K 7361.

Regarding the opacity (haze) of the molded article of the present invention, when the molded article of the present invention has a thickness 2 mm, the molded article has a haze of preferably 30% or less, and more preferably 20% or less. With the haze of 30% or less, the molded article can be suitably used in applications requiring a high transparency. The haze can be measured according to JIS-K 7105.

Regarding the impact resistance of the molded article of the present invention, a molded article obtained by using, as the glass filler, glass fibers surface-treated with the above-described sizing agent for glass fibers has an impact strength of preferably 20 to 30 $KJ/m^2$ when measured by a non-V notch Charpy impact test, and preferably 9 to 10 $KJ/m^2$ when measured by a V notch Charpy impact test. With the impact strength (non-V notch Charpy impact strength) of 20 to 30 $KJ/m^2$, the molded article can be suitably used in applications requiring a high strength. Both of the impact strengths can be measured according to JIS K 7111.

Moreover, the molded article of the present invention has a flexural modulus of preferably 2 to 6 GPa. With the flexural modulus of 2 to 6 GPa, the molded article can be suitably used in applications requiring a high strength. The flexural modulus can be measured according to JIS K 7171.

Further, the molded article of the present invention has a flexural strength of preferably 70 to 150 MPa. With the flexural strength of 70 to 150 MPa, the molded article can be suitably used in applications requiring a high strength. The flexural strength can be measured according to JIS K 7171.

The molded article of the present invention can be used in the same applications as those of conventionally known ABS resin molded articles (for example, household goods (such as toys), general equipment (such as office equipment), electronics (such as televisions), vehicle components (such as automotive instrument panel)) without particular limitation. Suitably, the molded article is applicable to parts which are likely to receive impacts and required to have a certain design, for example, casings of mobile phones, smartphones, tablet computers, and other similar devices, and so forth.

EXAMPLES

Next, the effects of the present invention will be described specifically by way of Examples. However, the present invention is not limited to Examples.

Example 1

In Example 1, glass fibers used as a glass filler were produced by a direct melt (DM) method.

First of all, a glass was produced using an inorganic mixture. The inorganic mixture thus used contained: based on a total mass of the inorganic mixture, 57% by mass of silicon dioxide ($SiO_2$);
14.5% by mass of aluminium oxide ($Al_2O_3$);
21% by mass of calcium oxide (CaO);
5% by mass of boron oxide ($B_2O_3$);
0.5% by mass of magnesium oxide (MgO); and
1.0% by mass of sodium oxide ($Na_2O$).

The mass ratio of calcium oxide to silicon dioxide (CaO/$SiO_2$) in the inorganic mixture was 0.368.

Specifically, the inorganic mixture was melted and mixed together at 1550° C. in a melting furnace having a capacity of 0.2 $m^3$ to obtain the glass. The glass was melted again at 1550° C. in a melting furnace having a capacity of 300 $cm^3$ equipped with a platinum bushing having 30 holes (1.4 mm in hole diameter) at a bottom surface thereof. The molten glass was drawn down from the holes of the bushing into the air at a rate of 750 m/minute. Thereby, the glass fibers having fiber diameters of 15 μm were molded. In the processes from drawing down the glass fibers until winding the glass fibers into a roll shape, water was sprayed for cooling, a surface treatment agent was applied using a roll coater, and the glass fibers were bundled. The surface treatment agent used was a mixture of an epoxy resin emulsion and an acrylonitrile copolymer emulsion at a mass ratio of 2:1. This surface treatment agent was the sizing agent for glass fibers described in Japanese Patent No. 2649211 (Patent Literature 3) and contained 6% by weight of an epoxy resin having an epoxy equivalent of 900 or more, 3% by weight of an acrylonitrile-styrene copolymer resin, and 0.2% by weight of a silane coupling agent (the balance was water). The glass fiber strand wound into the roll shape was drawn and cut to 3 mm length, followed by drying at 110° C. Thus, glass fibers having fiber lengths of 3 mm and an average diameter of 13 μm (glass filler) were obtained.

The glass filler obtained in Example 1 contained: based on the total mass of the glass filler,
57% by mass of silicon dioxide ($SiO_2$);
14.5% by mass of aluminium oxide ($Al_2O_3$);
21% by mass of calcium oxide (CaO);
5% by mass of boron oxide ($B_2O_3$);
0.5% by mass of magnesium oxide (MgO); and
1.0% by mass of sodium oxide ($Na_2O$).
The mass ratio of calcium oxide to silicon dioxide (CaO/$SiO_2$) in the glass filler was 0.368.

Note that the glass filler obtained in Example 1 did not contain $Fe_2O_3$ as an impurity.

Example 2

Glass fibers having fiber lengths of 3 mm and an average diameter of 13 μm (glass filler) were obtained by the same production method as in Example 1, except that the surface treatment agent was changed to water. Note that since water was used as the cooling agent when the glass filler was produced, the glass filler of Example 2 was a glass filler not surface-treated with any sizing agent.

The glass filler obtained in Example 2 contained: based on the total mass of the glass filler,
57% by mass of silicon dioxide ($SiO_2$);
14.5% by mass of aluminium oxide ($Al_2O_3$);
21% by mass of calcium oxide (CaO);
5% by mass of boron oxide ($B_2O_3$);
0.5% by mass of magnesium oxide (MgO); and
1.0% by mass of sodium oxide ($Na_2O$).
The mass ratio of calcium oxide to silicon dioxide (CaO/$SiO_2$) in the glass filler was 0.368.

Note that the glass filler obtained in Example 2 did not contain $Fe_2O_3$ as an impurity.

Comparative Example 1

Glass fibers having fiber lengths of 3 mm (glass filler) were obtained by the same production method as in Example 1, except that the composition ratio of the inorganic mixture was changed to: 55% by mass of silicon dioxide ($SiO_2$), 14% by mass of aluminium oxide ($Al_2O_3$), 23% by mass of calcium oxide (CaO), 6% by mass of boron oxide ($B_2O_3$), 0.3% by mass of magnesium oxide (MgO), 0.6% by mass of sodium oxide ($Na_2O$), and 0.1% by mass of titanium oxide ($TiO_2$).

The glass filler obtained in Comparative Example 1 contained: based on the total mass of the glass filler,
55% by mass of silicon dioxide ($SiO_2$);
14% by mass of aluminium oxide ($Al_2O_3$);
23% by mass of calcium oxide (CaO);
6% by mass of boron oxide ($B_2O_3$);
0.3% by mass of magnesium oxide (MgO); and
0.6% by mass of sodium oxide ($Na_2O$).
The mass ratio of calcium oxide to silicon dioxide (CaO/$SiO_2$) in the glass filler was 0.418.

Comparative Example 2

Glass fibers having fiber lengths of 3 mm (glass filler) were obtained by the same production method as in Comparative Example 1, except that the surface treatment agent was changed to water.

The glass filler obtained in Comparative Example 2 contained: based on the total mass of the glass filler,
55% by mass of silicon dioxide ($SiO_2$);
14% by mass of aluminium oxide ($Al_2O_3$);
23% by mass of calcium oxide (CaO);
6% by mass of boron oxide ($B_2O_3$);
0.3% by mass of magnesium oxide (MgO); and
0.6% by mass of sodium oxide ($Na_2O$).
The mass ratio of calcium oxide to silicon dioxide (CaO/$SiO_2$) in the glass filler was 0.418.

Evaluation Example 1

The glass fibers obtained in Examples 1 and 2 and Comparative Example 2 were measured for the refractive index by an immersion method according to the method B in JIS K 7142. Table 1 shows the result.

TABLE 1

|  | Refractive index of glass fibers |
| --- | --- |
| Example 1 | 1.548 |
| Example 2 | 1.548 |
| Comparative Example 2 | 1.558 |

Example 3

In Example 3, a transparent ABS resin composition was produced using the glass filler (glass fibers) obtained in Example 1 and a transparent ABS resin.

The transparent ABS resin used in the production of the resin composition was a resin obtained by mixing a butadiene-based rubber (weight average particle diameter: 0.12 μm) when a transparent acrylonitrile-styrene copolymer resin (AS resin) is polymerized, so that the butadiene-based rubber was dispersed in the AS resin.

The transparent ABS resin contained 30% by mass of methyl methacrylate (M), 5% by mass of acrylonitrile (A), 15% by mass of butadiene (B), and 50% by mass of styrene (S) (M:A:B:S (based on mass)=30%:5%:15%:50%). The blending ratio of the components was M:A:B:S (based on mass)=30%:5%:15%:50%.

The transparent ABS resin had a weight-average molecular weight (JIS K 7252) of 80,000.

The transparent ABS resin had an MFR (JIS K 7210) of 34.0 g/10 minutes at a temperature of 220° C. with a load of 98 N.

The transparent ABS resin had a total light transmittance (JIS-K 7361) of 91% when formed into a molded article having a thickness of 2 mm.

The transparent ABS resin had a refractive index (JIS K 7142) of 1.547.

The glass filler of Example 1 was mixed with the above transparent ABS resin at a mass ratio of the glass filler:the transparent ABS resin=10:90. The mixture was melted and kneaded at 230° C. with an extruder and then extruded. Thus, a transparent ABS resin composition was obtained. In the transparent ABS resin composition, the content of the transparent ABS resin was 90% by mass based on the total mass of the resin composition. The content of the glass filler in the transparent ABS resin composition was 10% by mass based on the total mass of the resin composition.

Example 4

A transparent ABS resin composition was obtained by the same method as in Example 3, except that the mixing ratio of the glass filler to the transparent ABS resin was changed to the glass filler:the transparent ABS resin=20:80 (based on mass). In the transparent ABS resin composition, the content of the transparent ABS resin was 80% by mass based on the total mass of the resin composition. The content of the glass filler in the transparent ABS resin composition was 20% by mass based on the total mass of the resin composition.

Example 5

A transparent ABS resin composition was obtained by the same method as in Example 3, except that the glass filler was changed to the glass filler obtained in Example 2. In the transparent ABS resin composition, the content of the transparent ABS resin was 90% by mass based on the total mass of the resin composition. The content of the glass filler in the transparent ABS resin composition was 10% by mass based on the total mass of the resin composition.

Comparative Example 3

An ABS resin composition was obtained by the same method as in Example 3, except that the glass filler was changed to the glass filler obtained in Comparative Example 1. In the ABS resin composition, the content of the transparent ABS resin was 90% by mass based on the total mass of the resin composition. The content of the glass filler in the ABS resin composition was 10% by mass based on the total mass of the resin composition.

Comparative Example 4

An ABS resin composition was obtained by the same method as in Example 4, except that the glass filler was changed to the glass filler obtained in Comparative Example 1. In the ABS resin composition, the content of the transparent ABS resin was 80% by mass based on the total mass of the resin composition. The content of the glass filler in the ABS resin composition was 20% by mass based on the total mass of the resin composition.

Comparative Example 5

An ABS resin composition was obtained by the same method as in Example 3, except that the glass filler was changed to the glass filler obtained in Comparative Example 2. In the ABS resin composition, the content of the transparent ABS resin was 90% by mass based on the total mass of the resin composition. The content of the glass filler in the ABS resin composition was 10% by mass based on the total mass of the resin composition.

Evaluation Example 2

Using the ABS resin compositions of Examples 3 to 5 and Comparative Examples 3 to 5, 50 mm×90 mm plates 2 mm in thickness were molded with an injection molding machine at 220° C. The molded plates were measured for the total light transmittance according to JIS K 7361, and further measured for the haze (opacity) according to JIS K 7105. Moreover, as a control, an ABS resin plate containing no glass fiber was also molded and subjected to the same measurements. Table 2 shows the result.

TABLE 2

|  | Total light transmittance (%) | Haze (%) |
| --- | --- | --- |
| Example 3 | 88.8 | 9.1 |
| Example 4 | 87.6 | 16.7 |

TABLE 2-continued

|  | Total light transmittance (%) | Haze (%) |
| --- | --- | --- |
| Example 5 | 88.7 | 9.3 |
| Comparative Example 3 | 86.9 | 43.7 |
| Comparative Example 4 | 83.9 | 67.0 |
| Comparative Example 5 | 86.6 | 43.7 |
| (Control) transparent ABS resin | 90.2 | 2.6 |

Evaluation Example 3

Using each of the ABS resin compositions of Examples 3 to 5 and Comparative Examples 3 to 5, an MFR measurement (JIS K 7210) was performed at a temperature of 220° C. with a load of 98 N, and a flexural test piece (thickness: 4 mm, width: 10 mm, length: 170 mm) and a Charpy impact strength test piece (thickness: 10 mm, width: 4 mm, length: 80 mm) were molded with an injection molding machine at 220° C. These molded test pieces were measured for the flexural modulus (JIS K 7171), flexural strength (JIS K 7171), and non-V notch Charpy impact strength (JIS K 7111). Table 3 shows the result.

TABLE 3

|  | MFR (g/10 minutes) | Flexural modulus (GPa) | Flexural strength (MPa) | Non-V notch Charpy impact strength (KJ/m$^2$) |
| --- | --- | --- | --- | --- |
| Example 3 | 20.9 | 3.8 | 96.4 | 26.6 |
| Example 4 | 17.2 | 5.9 | 122.0 | 28.9 |
| Example 5 | 20.0 | 3.5 | 94.1 | 24.3 |
| Comparative Example 3 | 18.0 | 4.0 | 97.2 | 26.9 |
| Comparative Example 4 | 13.6 | 6.7 | 126.8 | 29.8 |
| Comparative Example 5 | 17.3 | 3.7 | 94.4 | 24.7 |

Table 3 shows that the molded articles obtained from the ABS resin compositions of Examples retained excellent mechanical strengths without decreasing the transparency and opacity.

INDUSTRIAL APPLICABILITY

The transparent ABS resin composition of the present invention is utilizable in various industrial fields.

The invention claimed is:
1. A transparent ABS resin composition, consisting of, based on a total mass of the transparent ABS resin composition:
  70 to 98% by mass of a transparent ABS resin; and
  2 to 30% by mass of a glass filler,
  wherein the glass filler consists of, based on a total mass of the glass filler:
    55 to 60% by mass of silicon dioxide ($SiO_2$);
    10 to 15% by mass of aluminum oxide ($Al_2O_3$);
    18 to 22% by mass of calcium oxide (CaO);
    2 to 8% by mass of boron oxide ($B_2O_3$);
    0.01 to 1% by mass of magnesium oxide (MgO); and
    0.01 to 1% by mass of sodium oxide ($Na_2O$) or potassium oxide ($K_2O$), a mass ratio of calcium oxide to silicon dioxide (CaO/SiO$_2$) in the glass filler is in a range of 0.36 to 0.40, and the glass filler is glass fibers or glass fibers surface-treated with a sizing agent.

2. The transparent ABS resin composition according to claim 1, wherein the glass filler consists of, based on a total mass of the glass filler:
   55 to 60% by mass of silicon dioxide (SiO$_2$);
   10 to 15% by mass of aluminum oxide (Al$_2$O$_3$);
   18 to 22% by mass of calcium oxide (CaO);
   2 to 8% by mass of boron oxide (B$_2$O$_3$);
   0.01 to 1% by mass of magnesium oxide (MgO); and
   0.01 to 1% by mass of sodium oxide (Na$_2$O), and
   a mass ratio of calcium oxide to silicon dioxide (CaO/SiO$_2$) in the glass filler is in a range of 0.36 to 0.40.

3. The transparent ABS resin composition according to claim 1, wherein the mass ratio of calcium oxide to silicon dioxide (CaO/SiO$_2$) in the glass filler is in a range of 0.36 to 0.38.

4. The transparent ABS resin composition according to claim 1, wherein the glass filler is glass fibers surface-treated with a sizing agent.

5. The transparent ABS resin composition according to claim 1, wherein the transparent ABS resin further comprises methyl methacrylate.

6. A molded article obtained by molding the ABS resin composition according to claim 1.

7. The molded article according to claim 6, which is an injection molded article.

8. A transparent ABS resin composition, consisting of, based on a total mass of the transparent ABS composition:
   70 to 98% by mass of a transparent ABS resin; and
   2 to 30% by mass of a glass filler,
   wherein the glass filler consists of glass components and optionally at least one oxide,
   wherein the glass components consists of, based on the total mass of the glass filler:
   55 to 60% by mass of silicon dioxide (SiO$_2$);
   10 to 15% by mass of aluminum oxide (Al$_2$O$_3$);
   18 to 22% by mass of calcium oxide (CaO);
   2 to 8% by mass of boron oxide (B$_2$O$_3$);
   0.01 to 1% by mass of magnesium oxide (MgO); and
   0.01 to 1% by mass of sodium oxide (Na$_2$O) or potassium oxide (K$_2$O),
   wherein the optionally at least one oxide consists of an element selected from the group consisting of component selected from the group consisting of lanthanum, yttrium, gadolinium, bismuth, antimony, tantalum, niobium, tungsten, cobalt, copper, and neodymium, and
   wherein a mass ratio of calcium oxide to silicon dioxide (CaO/SiO2) in the glass filler is in a range of 0.36 to 0.40.

9. The transparent ABS resin composition according to claim 1, wherein the transparent ABS resin has a total light transmittance of at least 90%.

10. The transparent ABS resin composition according to claim 1, wherein the transparent ABS resin has a refractive index of 1.530 to 1.555.

11. The transparent ABS resin composition according to claim 1, wherein the transparent ABS resin has a weight-average molecular weight of 50,000 to 100,000.

12. The transparent ABS resin composition according to claim 1, wherein the glass filler has a refractive index of 1.543 to 1.552.

* * * * *